United States Patent [19]
Barnes

[11] 3,864,980
[45] Feb. 11, 1975

[54] APPARATUS FOR BALANCING TIRE AND WHEEL ASSEMBLIES

[76] Inventor: Cecil R. Barnes, 101 Elmhurst Dr., Lumberton, N.C. 28358

[22] Filed: Jan. 2, 1974

[21] Appl. No.: 430,019

Related U.S. Application Data

[63] Continuation-in-part of Ser. No. 274,693, July 24, 1972, abandoned.

[52] U.S. Cl. .................................. 73/484, 73/487
[51] Int. Cl. ........................ G01m 1/04, G01m 1/12
[58] Field of Search ........................ 73/482–487, 73/480

[56] References Cited
UNITED STATES PATENTS

| 1,744,431 | 1/1930 | Wood | 73/480 |
| 2,060,901 | 11/1936 | Smith | 73/480 X |
| 2,308,950 | 1/1943 | Hulsander | 73/483 |
| 2,588,766 | 3/1952 | Rogers | 73/484 |
| 2,979,958 | 4/1961 | Kennedy | 73/483 |
| 3,161,063 | 12/1964 | Hermanns | 73/483 |

FOREIGN PATENTS OR APPLICATIONS 528,177  Great Britain ....................... 73/480

Primary Examiner—James J. Gill
Attorney, Agent, or Firm—A. Yates Dowell, Jr.

[57] ABSTRACT

An apparatus for independently locating areas of unbalance in an automobile wheel and tire so that the tire and wheel can be assembled with opposing unbalanced areas after which final balancing of the assembly can be performed by adding conventional weights. Also, the apparatus tests for out-of-round and warped condition of the tire to determine if the tire is capable of being balanced.

2 Claims, 4 Drawing Figures

PATENTED FEB 11 1975 3,864,980

APPARATUS FOR BALANCING TIRE AND WHEEL ASSEMBLIES

CROSS-REFERENCE TO RELATED APPLIICATION

This applicationis a continuation-in-part of application Ser. No. 274,693 filed July 24,1972 and now abandoned.

BACKGROUND OF THE INVENTION

1. Field of the Invention.

This invetnion relates generally to an apparatus for statically balancing rotatable mechanisms and relates particularly to apparatus for testing the condition of automobile tires and for balancing automobile wheel and tire assemblies to improve the safety and comfort of persons within the automobile as well as to extend the life of the tires.

2. Description of the Prior Art.

In the past when a person bought new tires for his automobile, the worn tires and the balancing weights were removed from the wheel and the new tires were indiscriminately placed on the wheels. Normally the assembly was placed on a static balancing apparatus, such as a bubble balancer and sufficient weights were added to presumably compensate for any unbalanced condition. In some cases, the wheel and tire assemblies have been dynamically balanced by placing the wheel and tire assembly on a device having a drive mechanism which rotated the assembly at operating speeds and indicated areas of unbalance of the assembly. Such assemblies then were counterbalanced by weights in an effort to cause the wheel to rotate smoothly.

Tire manufacturers permit tires to be unbalanced as much as four ounces which has caused harmonic vibrations to occur, particularly at speeds between 40 and 70 miles per hour. The effect of the unbalanced tires has been compounded by unbalanced wheels so that it has required skilled personnel for mounting tires on the wheels. Even skilled personnel have had varying degrees of success in balancing the wheel assemblies. Normally when a customer complains that his tires bump or shimmy, the first problem is to locate the wheel or wheels causing the problem after which the weights are removed, the tire is rotated to a different position on the wheel, and then the assembly is rebalanced. if the rebalancing efforts are not successful, the tire is removed and a new tire is installed. The balancing process is repeated; however, the tire dealer is then involved with a used tire.

In many cases, tires have manufacturing defects such as occur when too much tension is applied to reinforcing wires when the tire beads are being formed with the result that the tires are either warped so that a portion of the bead is out of the plance of the remainder of the bead or the bead opening is in an oval or out-of-round configuration. Tires having a warped or out-of-round condition are difficult if not impossible to balance; however, these conditions are not easily ascertained unless the condition is extreme.

Some efforts have been made to determine areas of unbalance of the individual tire and wheel elements for indicating the location and in some cases the particular weights which must be added in an effort to balance the assembly. Some examples of the prior art are the U.S. Pat. Nos. to Wood 1,744,431; Kraft 2,270,657; Pfeiffer 2,679,751; Kennedy 2,979,958; and British Pat. No. 528,177 to Braund.

SUMMARY OF THE INVENTION

The present invention is an apparatus including a conventional bubble balancer or circular spirit level on which is mounted a terraced support member having a plurality of generally concentric rings with each ring being connected to an adjacent ring by substantially vertical wall structure. The tire and the wheel are independently placed on the device and a mark is applied to each element indicating the radial direction of overbalance. Thereafter the tire and wheel are assembled with the heavy portion of the wheel located diametrically opposite the heavy portion of the tire so that the unbalanced conditions of the assembled units tend to counterbalance each other. When the assembly is placed on the balancing machine, a few relatively light weights normally are sufficient to balance the assembly. When the tire is placed on the terraced member, such tire is checked for both warped and out-of-round conditions. If the tire bead does not lie flat on the generally horizontal rings, this indicates that the bead is warped. If the tire does not conform to the vertical wall structure, an out-of-round condition is indicated.

It is an object of the invention to provide a relatively simple apparatus for checking out-of-round and warped conditions of automobile tires as well as for balancing automobile tire and wheel assemblies by balancing the individual elements and assembling the elements in counterbalancing relationship.

Another object of the invention is to provide a tire balancing apparatus which is simple to operate, does not require the services of a skilled operator, and which can be easily attached to conventional static balancing mechanisms.

DESCRIPTION OF THE PREFERRED EMBODIMENT

Figure 1:
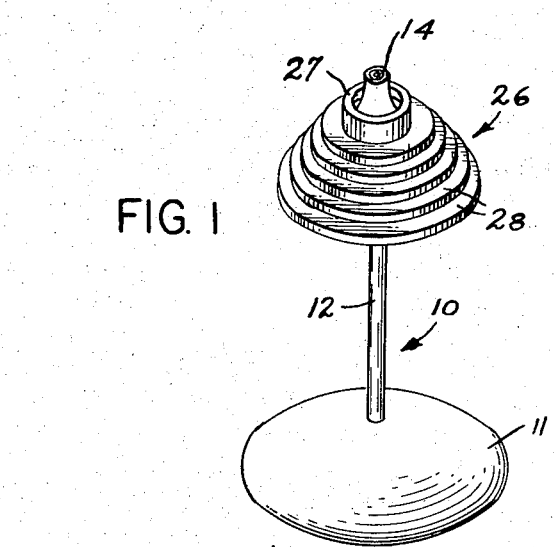
FIG. 1 is a perspective illustrating one embodiment of the present invention.
Figure 2:
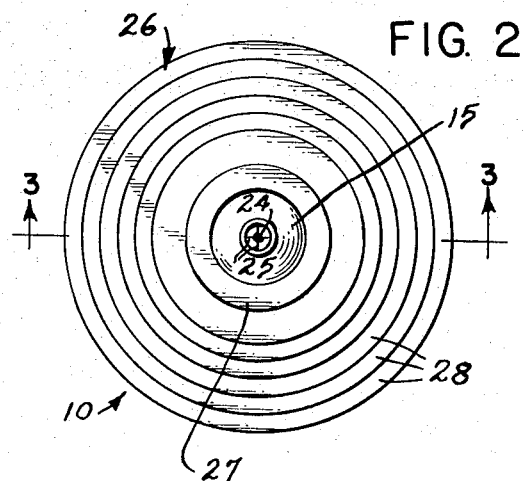
FIG. 2 is an enlarged top plan view thereof.
Figure 3:
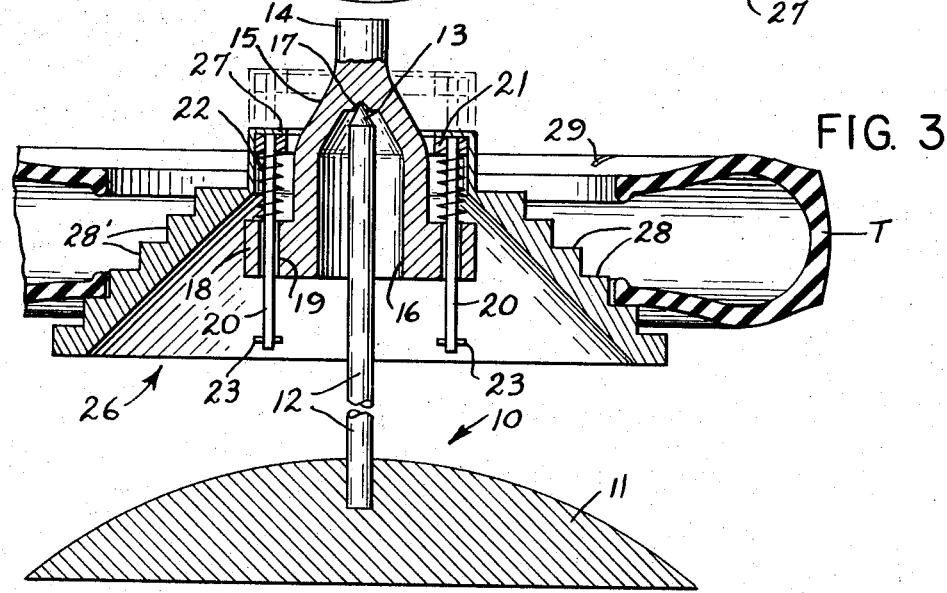
FIG. 3 is an enlarged section on the line 3—3 of FIG. 2 and showing the device in use with an automobile tire.

With continued reference to the drawing, a conventional bubble balancer 10 is provided having a base 11 on which an upstanding post 12 is fixed. The upper end of the post 12 terminates in a tapered cone 13 having a point at the end. A head 14 is provided having an exterior frusto-conical portion 15 and a hollow core 16 with a conical recess 17 at one end in which the point of the cone 13 is received. The head 14 is provided with an outwardly extending flange 18 around the base and such flange has a plurality of generally vertical openings 19. Each of the openings 19 slidably receives a post 20 the upper ends of which are connected to a support member 21. A spring or other resilient member 22 is disposed about each of the posts 20 and such springs maintain the support member 21 is spaced relationship to the head 14. A stop member 23 is fixed to the lower end of each post 20 to prevent accidental removal of the support member and to limit upward movement of such member by the tension of the springs 22.

The head 14 includes an upper surface which is provided with a fluid containing recess having a bubble or circular spirit level 24 confined beneath a glass face having cross hairs 25 inscribed thereon. The structure thus far described is conventional in the prior art and is used to balance a wheel and tire assembly by placing the assembly on the support member 21. If the assembly is unbalanced, the heavier portion of the assembly causes the head 14 to tilt to one side so that the bubble 24 is no longer centered on the cross hairs 25. When this condition occurs, conventional weights (not shown), normally supplied in half ounce increments, are placed on the rim of the wheel opposite the heavier portion to counterbalance the unbalanced condition and return the bubble to the center of the cross hairs.

The present invention includes a terraced support structure or body 26 which preferably is in the shape of a stepped frusto-conical hood. The body 26 includes an upper flange 27 adapted to be mounted on the support member 21 and a plurality of flat generally horizontally disposed concentric rings 28 connected by upright walls 28'. Normally the body 26 is fixed to the support member 21 in any desired manner, as by screws, rivets, welding, adhesive, or the like in such a manner that the center of gravity of the article being balanced is located below the point of the cone 13. Prior to mounting the body on the support member, such body is balanced about a vertical axis so that any unbalanced condition reflected by the bubble 24 will be the result of the condition of the unit being measured at the time.

In the operation of the device, a tire T is placed on the body 26 with the lower bead of the tire in engagement with an appropriate ring 28 and adjacent to an upright wall 28'. By looking through the upper bead, the operator can observe whether the entire lower bead is resting on the ring 28 or if a portion of such lower bead is spaced upwardly from the ring. An upwardly spaced portion indicates that the bead is warped and the tire should be replaced since subsequent balancing will be difficult or impossible. Also, the operator can observe whether the bead conforms substantially to the wall 28' or has portions spaced therefrom which indicates that the tire is out-of-round. An out-of-round tire also should be replaced. When the operator is satisfied that the tire is mechanically acceptable, the tire is released. When released, a balanced tire permits the head 14 to remain substantially stationary with the bubble 24 located at the center of the cross haris 25. If the tire is unbalanced, the heaviest portion of the tire sinks and tilts the body 26 and the head 14 to one side. The tilting of the body causes the bubble to move away from the center of the cross hairs. In this position, an imaginary line is drawn radially from the center of the cross hairs through the center of the bubble to the side wall of the tire and a mark 29 is applied to the tire casing by chalk or other marking medium. Under these conditions, the mark 29 is located on the tire casing in a position diametrically opposite from the unbalanced area of the tire. If desired, the imaginary line could be drawn from the center of the bubble through the center of the cross hairs to the casing of the tire which whould place the mark on the tire at the center of the unbalanced area.

Figure 4:
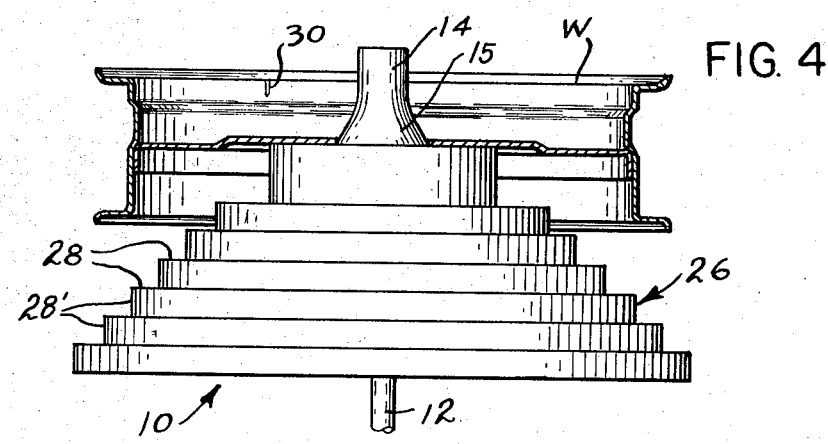
FIG. 4 is a side elevation illustrating the device in use with an automobile wheel.

After the tire has been marked, such tire is removed from the body 26 and a wheel W is placed on the frusto-conical portion 15 of the head 14, as illustrated in FIG. 4, and a mark 30 is applied to the rim of the wheel.

The wheel then is removed from the head and the tire T is mounted on the wheel W. If both of the marks 29 and 30 are applied to the area of unbalance of the individual elements, or if both marks are made diametrically opposite the unbalanced area, then the wheel and the tire are assembled with such marks diametrically opposite each other. On the other hand, if one of the tire or wheel is marked at the center of the unbalanced area and the other member is marked diametrically opposite the center of unbalance, then the marks 29 and 30 are located adjacent to each other. The mounting of the wheel and tire in assembled relationship with the areas of unbalance being diametrically opposite each other has the effect of counterbalancing the tire and the wheel.

After the tire and wheel have been assembled, the assembly again is placed on the head 14 and any unbalanced condition which may exist can be counterbalanced by a few relatively light conventional weights.

In a majority of cases, the tire T has a greater degree of imbalance than the wheel W and therefore it is contemplated that an unbalanced tire could be placed on the body 26 and the degree and area of imbalance noted. Then the tire is removed from the body and a weighted ballast pad (not shown) is permanently attached to the inside of the crown of the tire to partially counterbalance the heavy portion thereof. Thereafter, the tire again is placed on the body and the tire is marked as previously described. Under these conditions, a single light weight is normally enough to balance the assembly.

I claim:

1. In a bubble balance mechanism for independently indicating areas of imbalance of an unmounted tire and a wheel having a central hub-fitting opening, the balance mechanism including a base with an upstanding post, a head movably balanced on said post about a generally vertical axis, said head having a frusto-conical portion for receiving and supporting said wheel adjacent to said central opeiing, a spirit level carried by said head, and support means resiliently mounted on said head and vertically movalbe relative thereto: the improvement comprising a balanced body having an upper portion fixed to said support means, said body including a plurality of concentric offset stepped rings extending downwardly and outwardly from said upper portion, each of said stepped rings being of a size to support substantially the entire bead of an unmounted tire, whereby the bead of an unmounted tire is placed on an appropriate ring so that the spirit level indicates the direction of imbalance of the tire, and thereafter the wheel is mounted on the frusto-conical portion of the head so that the spirit level indicates the direction of imbalance of the wheel.

2. Apparatus for use with a balance mechanism having an upstanding post and a head movably balanced thereon about a generally vertical axis, said apparatus comprising a generally frusto-conical body, means for mounting said body on said head so that said head and said body are balanced about said vertical axis, said body including a plurality of concentric downwardly offset horizontally disposed rings connected together by vertically dispossed walls, each of said vertical walls being of a size to be received within and located adjacent to the bead of an unmounted tire, each of said horizontal rings supporting substantially the entire bead of said unmounted tire, whereby an unmounted tire is placed on an appropirate ring of said body so that out-of-round and warped conditions of the tire can be checked after which the balance mechanism indicates the direction of imbalance of the tire.

* * * * *